United States Patent [19]

Matsumoto et al.

[11] Patent Number: 4,802,759

[45] Date of Patent: Feb. 7, 1989

[54] THREE-DIMENSIONAL SHAPE MEASURING APPARATUS

[75] Inventors: Goro Matsumoto, 5-10-6-1, Sumikawa, Minami-ku, Sapporo-shi; Koichi Shimizu, Sapporo, both of Japan

[73] Assignees: Goro Matsumoto, Sapporo; Hitachi Medical Corporation, Tokyo, both of Japan

[21] Appl. No.: 82,815

[22] Filed: Aug. 6, 1987

[30] Foreign Application Priority Data

Aug. 11, 1986 [JP] Japan .................................. 61-188321

[51] Int. Cl.$^4$ ............................................. G01B 11/24
[52] U.S. Cl. ......................................... 356/376; 356/1; 364/560
[58] Field of Search ............................ 356/1, 375, 376; 364/560

[56] References Cited

U.S. PATENT DOCUMENTS

| 4,349,277 | 9/1982 | Mundy et al. | 356/376 |
| 4,452,534 | 6/1984 | Gribanov et al. | 356/376 |
| 4,559,684 | 12/1985 | Pryor | 356/376 |
| 4,641,972 | 2/1987 | Halioua et al. | 356/376 |
| 4,668,094 | 5/1987 | Matzumoto et al. | 356/376 |

FOREIGN PATENT DOCUMENTS 567243 9/1975 Switzerland ...................... 356/376

Primary Examiner—Richard A. Rosenberger
Attorney, Agent, or Firm—Hedman, Gibson, Costigan & Hoare

[57] ABSTRACT

A three-dimensional shape measuring apparatus includes a projection device having a projecting plane witha grating pattern formed therein and a light source for illuminating, through the projection plane, an object of interest located at an arbitrary position in the same three-dimensional coordinate system as that of the projection device, an observation device located in the same three-dimensional coordinate sysem as that of the object and having an observation plane and a specific point located between the observation plane and the object. In the apparatus, the grating pattern in the projection plane is projected on a surface of the object to form a projected grating pattern thereon when the light source is turned on, the grating pattern projected on the object is observed in the observation plane. The three-dimensional coordinates of an arbitrary sample point on the projected grating line on the object are determined by utilizing the fact that a sample point on the object is an intersection between a light ray emitted from the light source of the projection device and illuminating the sample point on the object and a line including the specific point of the observation device and the sample point in the observation plane, thereby measuring a three-dimensional shape of the object.

16 Claims, 6 Drawing Sheets

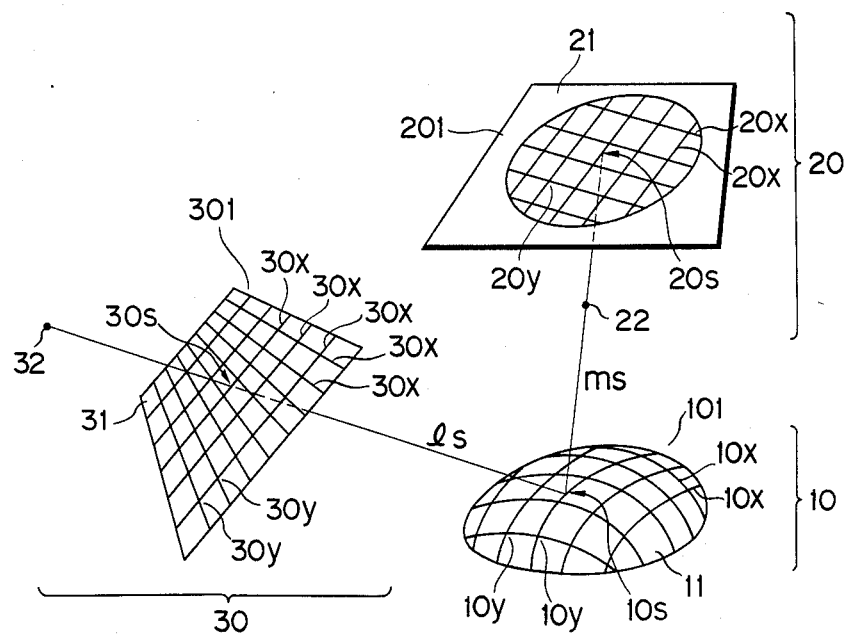
F I G. 1

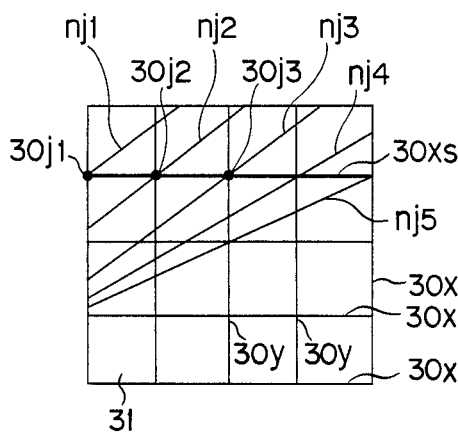
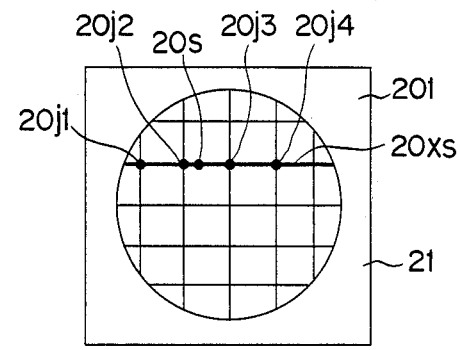
F I G. 4A        F I G. 4B
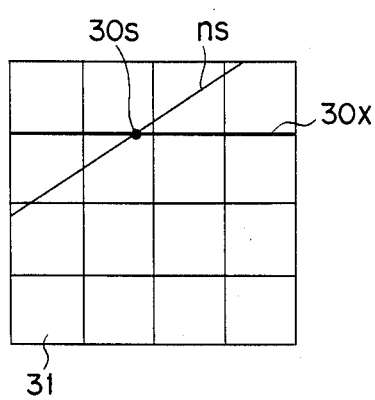
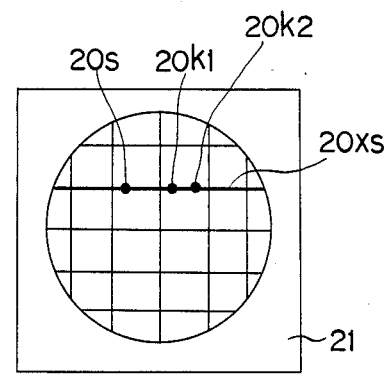
F I G. 5A        F I G. 5B

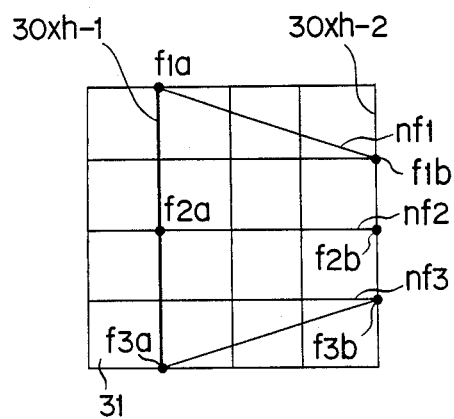
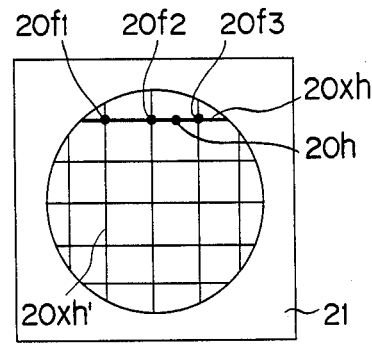
F I G. 6A       F I G. 6B
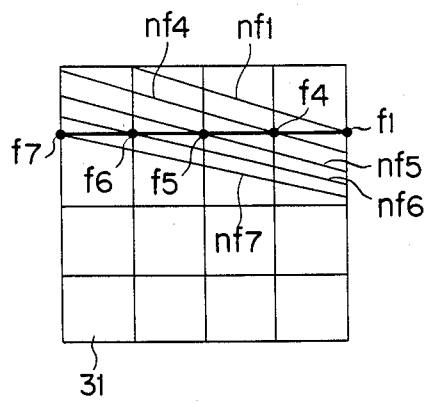
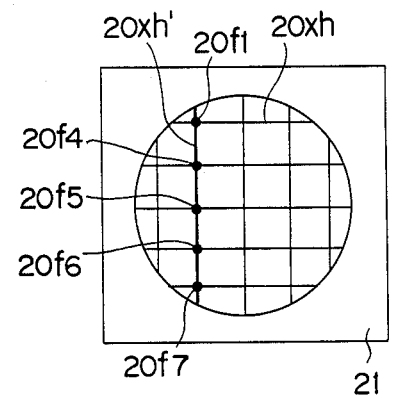
F I G. 7A       F I G. 7B

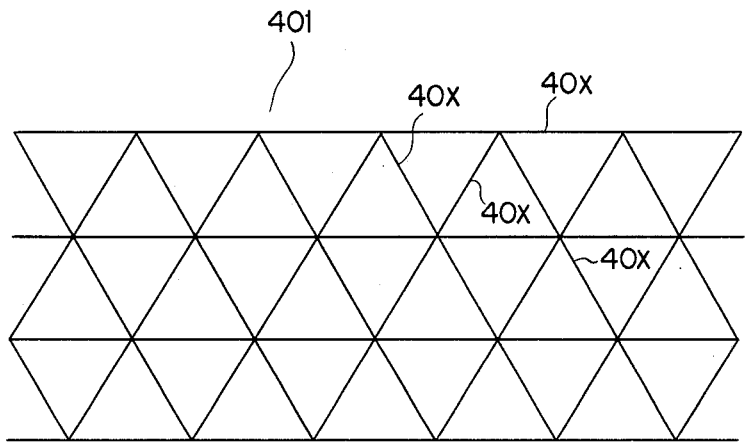
F I G. 9

THREE-DIMENSIONAL SHAPE MEASURING APPARATUS

BACKGROUND OF THE INVENTION

The present invention relates to an apparatus for measuring a three-dimensional shape of an object and, more particularly, to an apparatus for measuring a three-dimensional shape and position of the object in a noncontact manner.

The noncontact technique is particularly important in the measurement with the object which is not easily accessible or is easily deformable by contact. In medical field, the object can be a living organism which is generally soft and easily cause undesirable reflex by contact. Noncontact measurement has been widely applied to a variety of fields such as parts assembly in an automated factory in industrial fields, in addition to the medical field.

Some three-dimensional noncontact measurement schemes utilize a parallax error, such as a stereoscopic photography, pattern projection, and a lightsection method. A shape of an object of interest can be accurately measured by these methods. However, since the object is observed from two different viewpoints, two or more input images are required, and making the correspondence between the two images is not an easy task even with the help of a computer. Other conventional three-dimensional measurement schemes using one observation image are also known and exemplified by texture analysis and a Moire method. However, with these techniques an absolute position and size of the object of interest cannot be measured directly, and many practical limitations are imposed on these methods.

The apparatus disclosed in U.S. Pat. No. 4,668,094 (issued May 26, 1987, assigned to the assignees of the present application) has a single view point and uses a single observation image. This apparatus, however, requires two pattern-projection devices. Therefore, it has been hoped that an apparatus would be developed which has a simpler structure, uses fewer elements, and is able to perform image processing more simply and at a higher speed.

SUMMARY OF THE INVENTION

It is, therefore, an object of the present invention to provide a three-dimensional shape measuring apparatus capable of measuring absolute three-dimensional coordinates of an object to be measured by the observation from a single viewpoint.

It is another object of the present invention to provide an apparatus having a simple arrangement and capable of performing the above-mentioned measurement.

A three-dimensional shape measuring apparatus according to the present invention comprises a single projection device and a single observation device. The projection device comprises a projection plane having a grating pattern in a slide film or the like, and a light source for illuminating, through the projection plane, an object of interest located in an arbitrary position in a three-dimensional coordinate system. The observation device comprises, for example, an optical system and includes an observation plane (image-pickup surface) and a specific point (i.e., the optical center) located between an observation plane and the object.

In the three-dimensional shape measuring apparatus having the above arrangement, the grating pattern in the projection plane is projected on the surface of the object when the light source is turned on. A grating pattern image is formed on the surface of the object. Three-dimensional coordinates of any sample point in the grating line image on the object are determined by utilizing the fact that the point is an intersection of the following two lines. The first is the light ray emitted from the light source through the grating pattern in the projection device and illuminating the sample point on the object. The second line is the line including the specific point of the observation device and the sample point on the object. The three-dimensional shape of the object is obtained as a collection of such sample points and reproduced on a screen of a proper display device.

In the three-dimensional shape measuring apparatus according to the present invention, a grating pattern is formed in the projection plane. By observing the grating pattern projected on the object, the absolute positions of various parts of the object can be determined with a single image in the observation plane. Since only one observation device is required, and the image of the grating is used as information, the requirements for image processing can be far less prominent than in the conventional techniques. Therefore, the shape of the object can be efficiently measured. This efficiency is important in the case where real-time processing is essential, such as an eye of a robot.

The apparatus according to the present invention essentially comprises: one projection device including one plate having a grating pattern; and one observation device having a single viewpoint. One of the advantages of the present invention is such a simple arrangement to allow the efficient and accurate three-dimensional shape measurement of an object.

Another advantage of the present invention is that the information processing can be performed only by a computer, without complicated techniques. According to the apparatus of the present invention, the information processing consists of only general coordinate calculations or a linear arithmetic.

BRIEF DESCRIPTION OF THE DRAWINGS

FIGS. 1 and 2 are schematic perspective views of an apparatus according to an embodiment of the present invention;

FIGS. 4A to 5B are views for explaining the first technique (normal operation) for measuring a shape of an object of interest by the apparatus shown in FIG. 1;

FIGS. 6A to 7B are views for explaining the second technique (special operation) for measuring a shape of an object of interest by the apparatus shown in FIG. 1;

FIG. 9 is a view showing the second embodiment of a grating pattern of a pattern projection device.

DETAILED DESCRIPTION OF THE PREFERRED EMBODIMENTS

A. Arrangement of Apparatus

Figure 2:
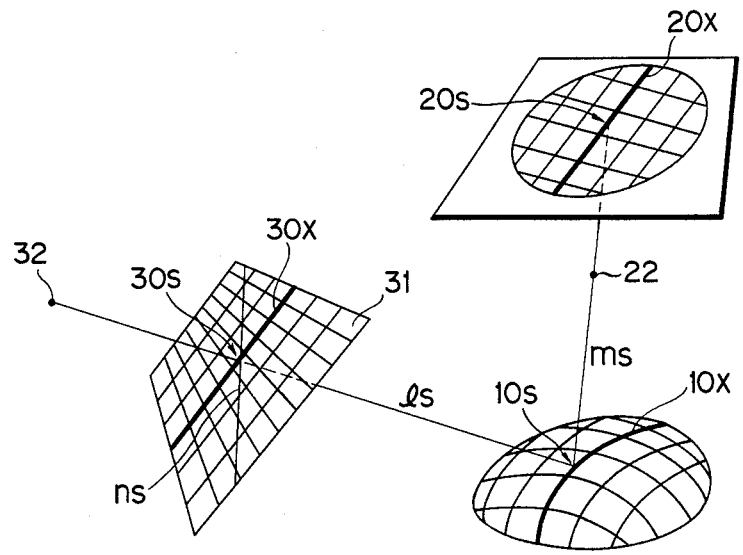

FIG. 1 shows a three-dimensional shape measuring apparatus according to an embodiment of the present invention, for determining three-dimensional coordinates of the outer surface of the object. In general, the outer shape, i.e., the outer surface of the object, can be regarded as a set of points defined by three-dimensional coordinates. The points of the outer surface of the object are appropriately sampled, and three-dimensional coordinates of the sampled points are determined. Once the coordinates are obtained, the data is processed by a computer, and the shape of the object is displayed on an appropriate display device. As is apparent from the above description, the more precise shape of the object can be obtained with the finer sampling intervals.

The apparatus shown in FIG. 1 includes an observation device 20, e.g., an image pickup device, for monitoring an object 10 and the sample points on the surface of the object. The observation device 20 is located in the same three-dimensional coordinate system as that of the object 10, and the coordinates of an observation plane 21 of the device 20 are known. A specific point 22, e.g., an optical center of a lens system of the observation device 20, is located between the observation plane 21 and the object 10. The three-dimensional coordinates of the point 22 are also known beforehand. The sample points on the object 10 correspond to those on the observation plane 21 through the specific point 22.

A pattern projection device 30 is arranged in the same three-dimensional coordinate system as that of the object 10 to specify the sample point on a surface 11 of the object 10. As shown in FIG. 1, the pattern projection device 30 comprises a projection plane 31 (e.g., a slide film having a grating pattern) having a specific grating pattern 301. A point light source 32 is arranged to project the grating pattern 301 of the projection plane 31 onto the object 10, and forms a grating pattern 101 on the object surface 11. The coordinates of the point light source 32 and the projecting plane 31 are known beforehand.

B. Definition and Description of Numerals and Symbols

In the grating pattern 301, each line constituting the grating is defined as a grating line 30x, and the intersection between any two crossing grating lines 30x is defined as a grating point 30y. The equation of each of lines 30x is known, and the three-dimensional coordinates of each of grating points 30y are also known. In a grating pattern image 101 on the object 10, an arbitrary point on a grating line image 10x including the grating point image 10y is defined as a sample point 10s. A sample point 20s on the observation plane is present on the line ms which connects the sample point 10s on the object and the specific point 22.

Since the grating pattern image 101 is the projection of the grating pattern 301, the line ls which connects the point light source 32 and the sample point 10s always crosses a grating line 30x in the projecting plane 31. The intersection between the line ls and the grating line 30x, which has a specific relationship with the sample point 10s, is defined as a sample corresponding point 30s.

C. Principle of Measurement

The apparatus of the present invention determines three-dimensional coordinates of the surface of the object 10 on the basis of principles (1) and (2) as follows. Principle (1) is that "the three-dimensional coordinates of the sample point 10s on the object 10 is determined, if the coordinates of the sample corresponding point 30s on the projection plane 31 are obtained". Principle (2) is that "the coordinates of the sample corresponding point 30s are determined, if the grating line 30x having the sample corresponding point 30s thereon is found among a large number of grating lines 30x in the projection plane 31." These principles will be described below in detail.

Principle (1) is to obtain coordinates of the sample corresponding point 30s in order to determine three-dimensional coordinates of the sample point 10s on the object 10. When three-dimensional coordinates of the sample corresponding point 30s which corresponds to the arbitrary sample point 20s are obtained, the three-dimensional coordinates of sample point 10s can be determined by the principle of triangulation. More specifically, if the three-dimensional coordinates of the sample corresponding point 30s are obtained, the equation of the line ls which passes through the point light source 32 and the sample corresponding point 30s is calculated, because the three-dimensional coordinates of the point light source 32 are known beforehand. Any point (i.e., the sample point 20s) on the observation plane 21 is specified at first, and its three-dimensional coordinates are determined beforehand. The equation of the second line ms, which passes through the point 20s and the specific point 22 with the known coordinates, can be specified in the same manner as described above. Therefore, coordinates of the sample point 10s are determined as the coordinates of the intersection between the first and the second lines, ls and ms. Coordinates of a collection of sample points on the object can be sequentially obtained in the same manner as described above. One-to-one correspondences between these sample points on the object, defined by three-dimensional coordinates and the sample points on the observation plane, are respectively established. The coordinate data is stored in an appropriate memory. The data is processed to accommodate the purpose of each application. For example, a three-dimensional image of the object 10 can be displayed on a suitable display device (not shown) using the collection of the coordinate data stored in the memory.

Principle (2) is to find the grating line 30x having the sample corresponding point 30s thereon from a large number of grating lines 30x in the projection plane 31 in order to determine the coordinates of the sample corresponding point 30s. When the grating line 30x having the sample corresponding point 30s thereon is found, the coordinates of the point 30s can be obtained by calculating the intersection of the found grating line 30x and the "epipolar line" ns of the line ms. The "epipolar line" is defined below.

Figure 3:
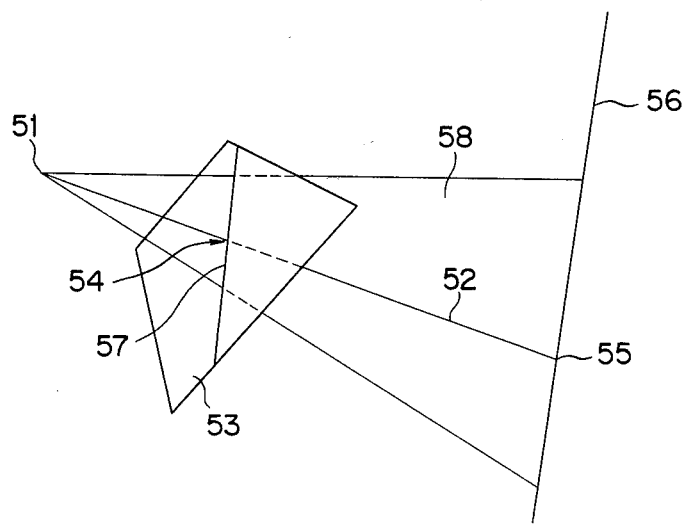
FIG. 3 is a view for supplementarily explaining the technique used in the present invention.

Assume that a light ray 52 emitted from a light source 51 reaches a point 55 through a point 54 on a plane 53, and that another line 56 passing through the point 55 exists, as shown in FIG. 3. Under these assumptions, a line 57 formed on the plane 53 is called an epipolar line when the line 56 is observed from the light source 51. The epipolar line 57 is considered as a back-projection of the line 56 which includes the point of interest 55. In other words, the epipolar line 57 is an intersection between the plane 53 and a plane 58 including the point light source 51 and the line 56. Therefore, the point of intersection 54 between the light ray 52 and the plane 53 always exists on the epipolar line 57.

Now, the equation of the second line ms, which passes through the sample point 20s in the observation plane and also passes through the specific point 22, (e.g., the optical center), is calculated. Since the three-dimensional coordinates of the specific point 22 are known beforehand, the equation of the second line ms is immediately determined upon specifying the point 20s in the observation plane. The equation of the second line ms can be transformed into the equation of an epipolar line ns defined as the back-projection of the second line ms on the projecting plane 31. Since the line ms passes the sample point 10s on the object, the epipolar line ns always passes through the sample corresponding point 30s which corresponds to the point 10s. Therefore, as has been said before, the point 30s can be specified by calculating the intersection of the grating line 30x and the epipolar line ns of the line ms.

When the point 30s on the projection plane, which corresponds to the sample point 20s on the observation plane, is specified, the coordinates of the sample point 10s on the object can be calculated as the intersection of the lines ls and ms as described above.

Here, the problem to obtain the three dimensional coordinates of the object reduces to the problem that how the sample corresponding point 30s is obtained in the projection plane 31.

D. Detailed Measurement Technique

The apparatus of the present invention determines three-dimensional coordinates of the object on the basis of the above-mentioned principles. In particular, according to the apparatus of the present invention, a very simple technique is used to find the grating line 30x having the sampling corresponding point 30s thereon from a large number of grating lines on the projection plane 31 (to be described later). For this reason, the sample corresponding point 30s can be specified by only general coordinate calculations.

Operations D-I and D-II will be described with reference to FIGS. 2 to 7B in order to obtain the points (i.e., sample corresponding points 30s) on the grating pattern 301 in the projection plane, which correspond to any sample points 20s on the observation grating pattern images 20x in the observation plane. D-I. Normal Operation One grating line image 20xs including the sample point 20s in the observation plane is selected in a pattern image 201, as shown in FIG. 4B. The position of the grating point images 20j (20j1, 20j2, 20j3, . . .) on the line image 20xs are easily obtained in the observation plane. The grating point images 20j (20j1, 20j2, 20j3, . . .) have corresponding points on the projection plane 31 (FIG. 4A) in the same manner as that the sample point 20s on the observation plane has the corresponding sample point on the projection plane 31.

A line mj1 (not shown) passing through a grating point image 20j1 and the specific point 22 is considered. An epipolar line nj1 of the line mj1 is obtained on the projection plane 31. The grating point 30j1 on the projection plane 31 which corresponds to the grating point image 20j1 is present on the epipolar line nj1, as described above. At the same time, this corresponding grating point 30j1 is one of the collections of grating points 30y. Therefore, the crossing grating lines and an epipolar line meet at a point 30j1, i.e., the grating point 30j1, is detected as the intersection of the epipolar line nj1 and one of the grating points 30y.

Epipolar lines (nj1, nj2, nj3, nj4, . . . ) for all point images (20j1, 20j2, 20j3, . . .) are calculated, and the corresponding grating points (30j1, 30j2, 30j3, . . . ) are detected among the many intersections between the epipolar lines and the grating points 30y as a series of the crossing points located on a line. A specific one grating line 30xs including all the crossing points is selected from a collection of grating lines 30x. The detected line 30xs is the grating line corresponding to the grating line image 20xs on the observation plane 21.

The sample corresponding point 30s corresponding to the first sample point 20s in the observation plane 21 is present on this grating line 30xs. As shown in FIGS. 5A and 5B, the epipolar line ns in the projection plane 31 is calculated for the sample point 20s, and an intersection 30s between the epipolar line ns and the grating line 30xs is calculated. This intersection 30s is the point corresponding to the sample point 20s in the observation plane.

As described above, a line ls passing through the point light source 32 in the projection device 30 and the sample corresponding point 30s is calculated (FIG. 2), and a line ms passing through the sample point 20s and the specific point 22 is calculated. Coordinates of an intersection between the two lines ls and ms are calculated. These coordinates are the spatial coordinates of the sample point 10s of the object 10.

As shown in FIG. 5B, as for any sample points 20k1, 20k2, . . . on the grating line image 20xs, the corresponding epipolar lines are obtained, and the intersections of the epipolar lines and the grating lines 30xs are then calculated and are defined as points corresponding to the points 20k1, 20k2, . . . . Therefore, the coordinates of the sample points (not shown) on the object, which respectively correspond to the sample points 20k1, 20k2, . . . , can be obtained at any high spatial resolution as long as the sample points are on the grating line projected on the object.

FIG. 2 shows a correspondence between the grating lines in the projection plane, the grating line images on the object, and the grating line images in the observation plane. As shown in FIG. 2, the apparatus in this embodiment has the same spatial disposition as in a light-section method. As is also apparent from the above spatial disposition, three-dimensional coordinates on the surface of the object can be continuously measured.

According to the measuring apparatus of this embodiment, points in terms of coordinates of the individual sample points on the object are independently determined. Even if a large indentation is formed on the surface of the object of interest, the shape of the object can be accurately measured. If smoothness of the surface of the object is known beforehand, some of calculations can be omitted. More specifically, if only single correspondence in a set of lines, i.e., between the grating line 30x, the grating line image 10x on the object, and the grating line image 20x on the observation plane is established, other sets of lines can be ordered under the assumption wherein "adjacent grating line images of 10x on the object are the projection of the corresponding adjacent grating lines of 30x".

D-II. Special Operation

In rare occasion, the normal operation (D-I) cannot specify one grating line in the projection plane 31 which corresponds to the grating line image 20xs in the observation plane, depending on the positional relationship between the measuring devices and the object.

FIGS. 6A and 6B show the above case. A grating line image 20xh in the observation plane having a sample point 20h thereon is taken into consideration. Grating point images 20f1, 20f2, and 20f3 on this line are selected. Epipolar lines nf1, nf2, and nf3 for the grating point images 20f1, 20f2, and 20f3 are formed in the projection plane 31. In this case, of the common points between the epipolar lines and the crossing grating points, points f1a, f2a, and f3a on a grating line 30xh-1, and points f1b, f2b, and f3b on a grating line 30xh-2 are regarded as the points corresponding to the points 20f1, 20f2, and 20f3 on the line 20h. In this case, one of the corresponding grating line candidates 30xh-1 and 30xh-2 is the truly corresponding grating line, and the other is a false line.

In order to distinguish the truly corresponding grating line from the false one, another grating line image 20xh' having one point 20f1 common with the original grating line image 20xh, as shown in FIG. 7, is taken into consideration. Epipolar lines nf1, nf4, nf5, nf6, . . . for the grating point images 20f1, 20f4, 20f5, 20f6, . . . present on the line image 20xh' are calculated to obtain grating points f1, f4, f5, f6, and f7 corresponding to the grating point images 20f1, 20f4, 20f5, 20f6, and 20f7. Of the grating points f1, f4, f5, f6, and f7, the grating point f1 serves to detect the corresponding grating line 30xh-2 distinguished from the false line 30xh-1. That is, the grating point f1 in the projection plane corresponds to the grating point image 20f1 in the observation plane. Referring to FIG. 6A and 6B, the grating line 30xh-2 has the common point at the point f1b and is distinguished as the truly corresponding grating line of the grating line image 20xh.

If a single corresponding grating line cannot be specified with the grating line image 20xh', another grating line image is selected to perform the above operation.

D-III. Operation Using Computer

Figure 8:
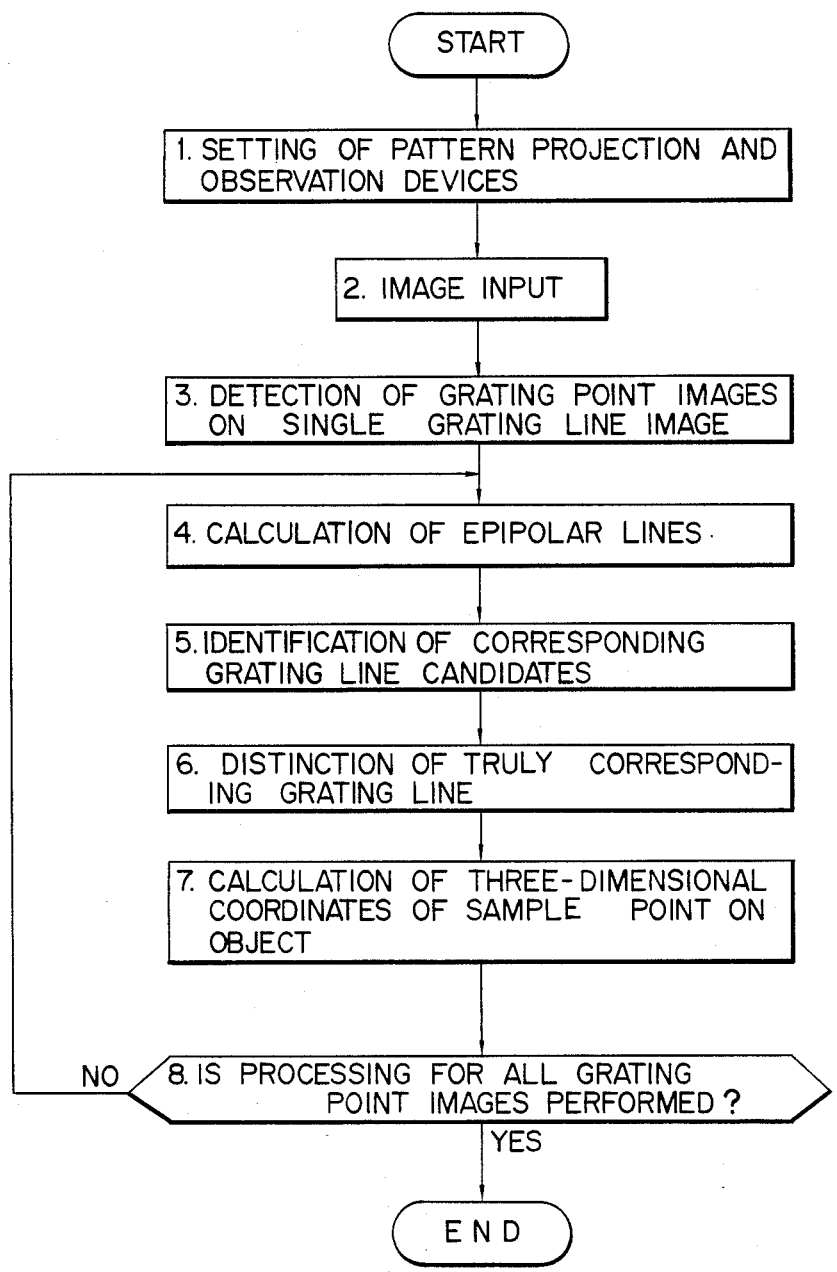
FIG. 8 is a flow chart for explaining the third technique (operation using a computer)

FIG. 8 is a flow chart of the operations I and II using a computer. In this case, operations are performed for all grating line images but not for only one grating line image of the grating pattern 201 picked up on the observation plane 21. The operation procedures of the flow chart will be described with reference to the operation steps in FIG. 8.

1 . . . Setting of Pattern Projection and Observation Devices

The projection and observation devices 30 and 20 are set such that the grating pattern 101 is projected on the object 10 (FIG. 1) and that the projected pattern 101 on the object can be observed in the observation plane 21. The positions of the points 22 and 32, and the planes 21 and 31 are determined.

2 . . . Image Input

Coordinates of each grating line image of the pattern image 201 in the observation plane are read.

3 . . . Detection of Grating Point Images on Single Grating Line Image

The grating point images present on a single grating line 20x of the observation grating pattern image 20l are detected.

4 . . . Calculation of Epipolar Lines

The epipolar line in the projection plane 31 is obtained for each grating point image.

5 . . . Identification of Corresponding Grating Line Candidates

Among many intersections between the epipolar lines and the crossing grating lines, the points, at which these three lines meet, are detected and the corresponding grating line is identified.

6 . . . Distinction of Truly Corresponding Grating Line

If a single candidate is identified as in the operation I (normal operation), the line is determined as the corresponding grating line. If the number of the candidate lines is more than two, the true grating line is distinguished from the false ones as in the operation II (special operation).

7 . . . Calculation of Three-Dimensional Coordinates of Sample Point on Object Sample points on the given grating line are specified in the observation plane, and three-dimensional coordinates of the sample points on the object, which correspond to the sample points in the observation plane are determined.

8 . . . Is Processing for All Grating Point Images Performed?

E. Other Embodiments

In the above embodiment shown in FIG. 1, by assigning a plurality of colors to the grating lines 30x of the grating pattern 301, the projected grating pattern 101 on the object can also be colored. Thereby the above processing can be performed more effectively. In this case, the observation device is designed to discriminate the colors.

In the coloring of the grating pattern 301, each set of three grating lines 30x are colored in red, green, and blue, so that the grating lines 30x are repeatedly colored in red, green, blue, red, green, blue, . . . . . The grating lines perpendicular to these colored lines are also colored in the same manner as described. Therefore, the number of colors of the grating points is six, i.e., magenta, yellow, cyan, red, blue, and green. The projected pattern 101 of the object and the pattern image 201 on the observation plane are also colored.

A red grating line image 20x in the pattern image 201 in the observation plane is taken into consideration. The grating line 30x on the projection plane 31 which corresponds to the grating line 20x is naturally red. Therefore, in this case, the above processing can be performed by paying an attention to only red grating lines in the projection plane 31.

When the density of grating patterns is increased to improve measurement precision, the frequency of occurrence of the positional relationship shown in FIG. 6 is increased. However, even if the pattern density is increased, the possibility of the false candidate is largely suppressed by the usage of the color information. In this case, operations can be performed as if the pattern density is low. Therefore, the spatial resolution can be improved while the false correspondences can be prevented, and the object can be smoothly reproduced.

In the embodiment shown in FIG. 1, the grating pattern with orthogonal grating lines is used. However, the pattern may be constituted by a number of straight lines or curves, as long as the pattern has a number of intersections. For example, a grating pattern 401 having grating lines 40x crossing at an angle of 60° may be used, as shown in FIG. 9. In this case, the spatial resolution can be improved while preventing the increase of the false correspondences.

What is claimed is:

1. A three-dimensional shape measuring apparatus for determining three-dimensional coordinates on an outer surface of a three-dimensional object when placed in a space measured by a three dimensional coordinate system comprising:

a projection device comprising a single projection plane of known three-dimensional coordinates and having a plurality of grating lines wherein at least some of said grating lines cross each other thereby constituting a grating pattern, and a light source of known three-dimensional coordinates for illuminating, through said projection plane, said object -dimensional located at an arbitrary position in the same three an observation device having a single viewing point and comprising a lens system having an optical center, an observation plane of known three-dimensional coordinates and a specific point of known three-dimensional coordinates corresponding to the optical center of the lens system, said specific point being located between said observation plane and said object; and means for determining the three-dimensional coordinates of an arbitrary sample point on one of the projected grating lines of the grating pattern on said object, said sample point on said object being the intersection of a line defined by a light ray emitted from said light source of said projection device and illuminating said sample point on said object and a line including said specific point of said observation device and the image of said sample point in said observation plane, thereby measuring the three-dimensional shape of the object.

2. An apparatus according to claim 1, wherein said projection device comprises a slide film having said grating pattern therein.

3. An apparatus according to claim 1, wherein the grating pattern in said projection device comprises a plurality of orthogonal lines.

4. An apparatus according to claim 1, wherein the grating pattern in said projection device comprises a plurality of straight lines crossing at an angle of 60°.

5. An apparatus according to claim 1, wherein said grating pattern in said projection plane is in at least one color.

6. An apparatus according to claim 1, wherein said three-dimensional coordinates determining means comprises a computer.

7. An apparatus according to claim 1, wherein said three-dimensional coordinates determining means comprises: a first means for calculating an equation of said light ray emitted from said light source of said projection device and illuminating the sample point on the object, by determining a sample corresponding point at which said light ray crosses one of said grating lines in said projection plane.

8. An apparatus according to claim 7, wherein said first means comprises: a second means for indentifying said one grating line on which said sample corresponding point exists, and a third means for calculating an equation of epipolar line of said line which includes said specific point of said observation device and sample point image in the observation plane, defined as the back-projection of the line on the projection plane.

9. A three-dimensional shape measuring apparatus for determining three-dimensional coordinates on an outer surface of a three-dimensional object when placed in a space measured by a three-dimensional coordinate system comprising:

a projection device comprising a single projection plane of known three-dimensional coordinates and having a plurality of grating lines wherein at least some of said grating lines cross each other thereby constituting a grating pattern, and a light source of known three-dimensional coordinates for illuminating, through said projection plane, said object located at an arbitrary position in the same three-dimensional coordinate system as that of said projection device thus projecting said grating pattern on the object;

an observation device having a single viewing point and comprising a lens system having an optical center, an observation plane of known three-dimensional coordinates and a specific point of known three-dimensional coordinates corresponding to the optical center of said lens system, said specific point being located between said observation plane and said object; and means for determining the three-dimensional coordinates of an arbitrary sample corresponding point on said projection plane and the grating line having said sample corresponding point by utilizing the fact that the sample corresponding point is the intersection of said grating line and an epipolar line, said three dimensional determining means comprising:

a means for calculating an equation of said light ray emitted from said light source of said projection device and illuminating the sample point on the object, by determining the sample corresponding point at which said light ray crosses one of said grating lines in said projection plane, said calculating means comprising means for identifying one said grating line on which sample corresponding point exists, and a third means for calculating an equation of an epipolar line of said line which includes said specific point of said observation device and sample point image in the observation plane, defined as the back-projection of the line on the projection plane, said identifying means comprising, pattern image in a means for reading a grating said observation plane, means for detecting one grating line image on which said sample point image exists, means for detecting coordinates of grating point images all of which exist on said one grating line image, means for calculating equations of auxiliary lines each of which includes one of said grating point image and said specific point, means for calculating each equation of each epipolar line of said auxiliary line, defined as the back-projection on the line on the projection plane, means for detecting the grating points, at which two of said grating lines in the projection plane and said epipolar line of said auxiliary line intersect, and means for identifying one grating line on which all of said grating points detected in just previous means are present.

10. An apparatus according to claim 9, wherein aid second means operates using a computer.

11. An apparatus according to claim 9, wherein said projection device comprises a slide film having said grating pattern therein.

12. An apparatus according to claim 9, wherein he grating pattern in said projection device comprises a plurality of orthogonal lines.

13. An apparatus according to claim 9, wherein the grating pattern in said projection device comprises a plurality of straight lines crossing at an angle of 60°.

14. An apparatus according to claim 9, wherein said grating pattern in said projection plane is in at least one color.

15. An apparatus according to claim 9, wherein said three-dimensional coordinates determining means comprises a computer.

16. An apparatus according to claim 9 wherein the means for identifying said grating line on which said sample corresponding point exists comprises a computer.

* * * * *